L. C. PRITCHARD.
AUTOMOBILE FENDER.
APPLICATION FILED MAY 4, 1915.
1,169,509.
Patented Jan. 25, 1916.
2 SHEETS—SHEET 1.
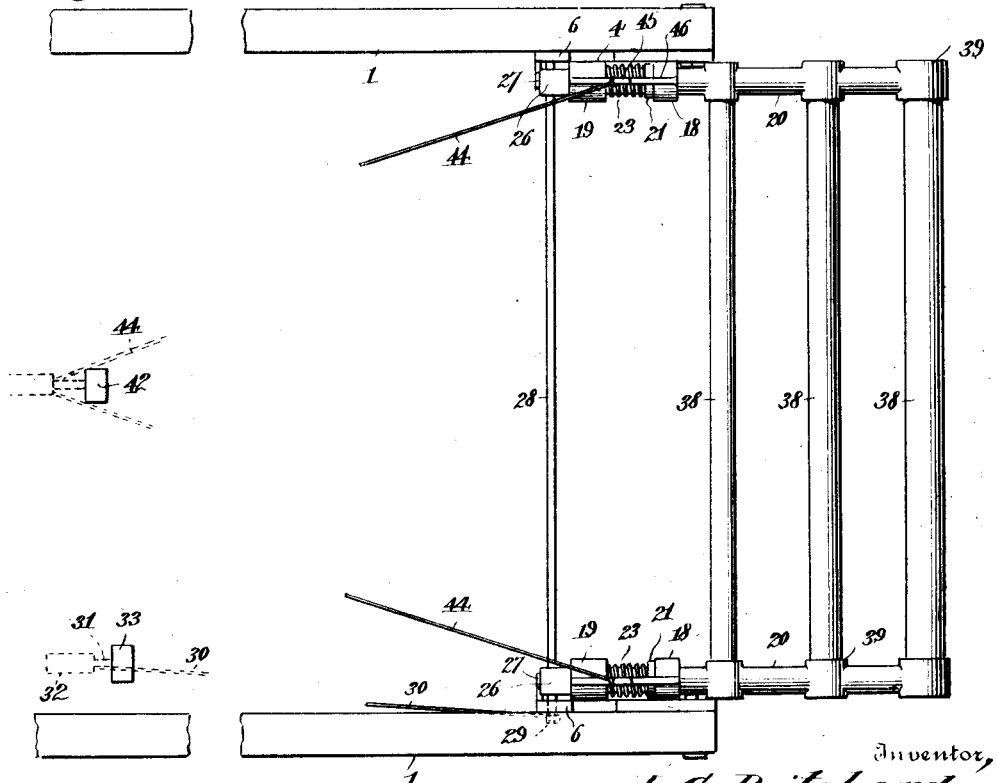

L. C. PRITCHARD.
AUTOMOBILE FENDER.
APPLICATION FILED MAY 4, 1915.

1,169,509.

Patented Jan. 25, 1916.
2 SHEETS—SHEET 2.

Fig. 3. Fig. 5.

Fig. 4.

Witnesses:

Inventor,
L. C. Pritchard,
By Victor J. Evans,
Attorney

UNITED STATES PATENT OFFICE.

LEWIS C. PRITCHARD, OF PARKERSBURG, WEST VIRGINIA, ASSIGNOR OF FOUR-FIFTHS TO WILLIAM M. MILLER, OF PARKERSBURG, WEST VIRGINIA.

AUTOMOBILE-FENDER.

1,169,509.  Specification of Letters Patent.  Patented Jan. 25, 1916.

Application filed May 4, 1915. Serial No. 25,786.

*To all whom it may concern:*

Be it known that I, LEWIS C. PRITCHARD, a citizen of the United States, residing at Parkersburg, in the county of Wood and State of West Virginia, have invented new and useful Improvements in Automobile-Fenders, of which the following is a specification.

This invention relates to fenders particularly designed for use upon automobiles, motor trucks and other motor driven vehicles, the object of the invention being to produce a fender which may be easily mounted upon the standard make of automobile or motor truck, and which, when in its raised or inoperative position, provides for ample road clearance and is firmly sustained in such raised or elevated position. When the fender is tripped and allowed to fall and assume its operative or catching position, it prevents persons and objects from being carried under the machine so as to be struck by the lower portions of the vehicle.

A further object of the invention is to provide a fender of the class referred to which is automatically tripped upon coming into contact with a person or object and which quickly assumes its catching or operative position.

A further object of the invention is to provide means whereby the fender may be manually tripped and manually raised and reset.

With the above and other objects in view, the invention consists in the novel construction, combination and arrangement of parts, as herein described, illustrated and claimed.

In the accompanying drawings:—Figure 1 is a side elevation of a sufficient portion of an automobile to illustrate the application of the fender of this invention thereto. Fig. 2 is a plan view of the same. Fig. 3 is an enlarged vertical section showing the fender in its catching position. Fig. 4 is a similar view showing the fender in its raised position. Fig. 5 is an enlarged fragmentary rear elevation taken adjacent to one side of the fender and showing the machine frame in cross section. Fig. 6 is a detail side elevation showing the raising and resetting pedal. Fig. 7 is a similar view of the tripping pedal.

Referring to the drawings 1 designates the side bars of the frame or chassis of an automobile, motor truck or the like, and 2 portions of the front body supporting springs which are connected to the forward extremities of the bars 1 by the usual shackle bolts 3.

In carrying out the present invention, I provide a pair of pivotally mounted fender carrying knuckles 4 the shape of which is best illustrated in Figs. 3 and 4. Each of said knuckles is pivotally mounted on a bolt or pin 5 which is carried by the lower portion of a substantially U-shaped bracket comprising the substantially upright arm 6 adjustably secured to the adjacent frame bar 1, the forward inclined portion 7 which is mounted on the bolt 3 and therefore pivotally related to the frame bar 1, and the lower connecting or hanger portion 8 which extends between and connects the portions 6 and 7.

By reason of the fact that each bracket is pivotally connected to the frame by means of the bolt 3, the upper extremity of the portion 6 of the bracket may be adjusted relatively to the adjacent frame bar 1 in the manner best illustrated in Fig. 5 wherein it will be seen that adjacent to its upper end the portion 6 of the bracket is provided with two outwardly extending lugs 9 and 10 formed with threaded openings to receive adjusting screws 11 and 12 adapted to respectively bear against the upper and lower sides of the bottom flange 13 of the frame bar 1. By means of the adjustment just referred to, the angularity of the whole bracket may be adjusted in relation to the frame bar 1 for the purpose of correspondingly adjusting the angle of the fender when it is dropped to catching position.

Each of the brackets is further provided with a pendent extension 14 having a plurality of holes 15 therein to receive a stop 16 shown in the form of a pin or bolt insertible through any one of the openings 15 and adapted to coöperate with a stop shoulder 17 on the adjacent knuckle to limit the pivotal movement of the knuckle on the supporting bracket and thereby correspondingly limit the downward movement of the fender supporting arms hereinafter described.

Each knuckle 4 comprises the front and rear tubular bosses or sleeve like portions 18 and 19 to receive the rear end portion of one of a pair of fender arms 20. The arm 20 extends entirely through the sleeve or bearing 18 and the extreme rear end thereof is slidingly mounted in the bore of the sleeve or bearing 19. A stop collar 21 encircles the arm 20 just in rear of the bearing 18, said collar being fastened to the arm by means of a set screw 22 or the equivalent thereof. A helical expansion spring 23 encircles the arm 20 and is interposed between the collar 21 and the adjacent face of the sleeve or bearing 19, said spring therefore serving to yieldingly sustain the arm 20 at the forward limit of its movement, such movement being limited by the collar 21.

Adjacent to its rear end each knuckle 4 is provided with a notch 24 to receive the nose 25 of a latch 26, the latch being held yieldingly in engagement with the knuckle by means of a backing spring 27. It will be understood that there are two knuckles 14 arranged at opposite sides of the machine and therefore two latches 26 are employed. These latches are simultaneously operable by means of a rock shaft 28 extending transversely of the machine frame and having said latches fastened thereon by any suitable means such as binding screws or keys. Between the latches, a latch tripping arm 29 is mounted on the shaft 28 in fixed relation thereto and from said arm or lever 29 a connection 30 such as a cable extends rearwardly to a bell crank lever 31 pivotally supported by a bracket 32 on the platform or floor of the car and operable by means of a pedal 33 extending through the floor and connected to one arm of said elbow lever as shown in Fig. 7.

34 designates a latch tripping plunger used in connection with each fender arm 20, the same being shown in the form of a pin which is threaded into the rear end of the arm 20 as indicated at 35 and locked by means of a jam nut 36 after the proper adjustment and projection of the tripping plunger has been effected. It will be seen that as the arm 20 is thrust rearwardly by impact with a person or object, the pin 34 pushes the nose 25 of the latch 26 out of the notch 24, thereby releasing the knuckle and permitting the fender to drop to its catching position. It will also be understood that both of the latches 26 are simultaneously tripped by the rearward thrust of the fender and the coöperation of the plungers 34 with said latches.

Each of the fender arms 20 is provided at a plurality of points with openings 37 to receive cross bars 38 and adjacent to each of said openings each bar is reinforced by an annular flange or bead 39 the same being split at 40 to allow the cross bar to be firmly clamped in place by means of a cap screw 41 or the equivalent thereof. The forward cross bar 38 is preferably of greater diameter than those in rear thereof in order that it may be cushioned or surrounded by a covering of flexible material to prevent injury to a person being struck by the fender.

In order to raise the fender and reset the same after it has been tripped, I provide a pedal 42 which works through the floor of the vehicle and is connected to one arm of a bell crank lever 43 from which a connection 44 such as a cable extends to an eye 45 shown for convenience as arranged centrally of an arched arm 46 of the adjacent knuckle 4. It will of course be understood that there are two connections 44 one for each knuckle.

From the foregoing description, taken in connection with the accompanying drawings, the construction and operation of the automobile fender will now be readily understood. The fender is normally sustained in its raised position by the action of the springs 23 which operate to hold the fender arms at the forward limit of their movement, permitting the latches 26 to engage the knuckles in the manner illustrated in Fig. 3. When the fender comes in contact with a person or object and sustains a rearward thrust, the plungers 34 act to trip the latches 26 and throw them out of engagement with the notches in the knuckles, whereupon the fender drops to its catching position as shown in Fig. 4. If the driver of the car has time to drop the fender, he operates the proper pedal to rock the shaft 28, thereby tripping the latches 26 out of engagement with the knuckles, and permitting the fender to drop. To reset the fender, the pedal 42 is depressed thereby rocking the knuckles 4 on their pivotal connection with their supporting brackets whereupon the knuckles will automatically push the latches aside until they snap into engagement with the notches 24.

It will be observed that no alteration whatever is needed in the construction of the car itself, it being merely necessary to remove the shackle bolt 3 at each side of the car and reinsert the same in its position after passing it through the forward portion 7 of the supporting bracket. After this the substantially upright portion 6 of the bracket may be adjusted up and down to give the desired angularity to the bracket so that when the fender arms 20 are resting against the stops 16, the necessary clearance will still be maintained between the lowest portion of the fender and the road surface.

What I claim is:—

1. The combination with the body-supporting frame of an automobile, of a fender supported at the front thereof, said fender comprising a pair of knuckles having a pivotal relation to said frame, fender arms carried by and projecting forwardly from said knuckles, latches engaging said knuckles to hold the fender arms raised, and means for tripping said latches to release the knuckles and permit the fender to drop to catching position.

2. The combination with the body-supporting frame of an automobile, of a fender supported at the front thereof, said fender comprising a pair of knuckles having a pivotal relation to said frame, fender arms carried by and projecting forwardly from said knuckles and having a slidable relation to said knuckles, and latches engaging said knuckles to hold the fender arms raised and arranged to be tripped by said fender arms as the latter are thrust rearwardly.

3. The combination with the body-supporting frame of an automobile, of a fender supported at the front thereof, said fender comprising a pair of knuckles having a pivotal relation to said frame, fender arms carried by and projecting forwardly from said knuckles and having a slidable relation to said knuckles, latches engaging said knuckles to hold the fender arms raised and arranged to be tripped by said fender arms as the latter are thrust rearwardly, and springs for yieldingly sustaining said fender arms at the forward limit of their movement in relation to the knuckles.

4. The combination with the body-supporting frame of an automobile, of a fender supported at the front thereof, said fender comprising a pair of knuckles having a pivotal relation to said frame, knuckle-supporting brackets pivotally attached to said frame, means for adjusting the angle of said frame in relation to said frame, stops on said brackets coöperating with said knuckles to limit the tripping movement of the fender, fender arms carried by and projecting forwardly from said knuckles, latches engaging said knuckles to hold the fender arms raised, and means for tripping said latches to release the knuckles and permit the fender to drop to catching position.

5. The combination with the body-supporting frame of an automobile, of a fender supported at the front thereof, said fender comprising a pair of knuckles having a pivotal relation to said frame, fender arms carried by and projecting forwardly from said knuckles and having a slidable relation to said knuckles, latches engaging said knuckles to hold the fender arms raised and arranged to be tripped by said fender arms as the latter are thrust rearwardly, and adjustable latch-tripping plunger pins carried by said fender arms.

6. The combination with the body-supporting frame of an automobile, of a fender supported at the front thereof, said fender comprising a pair of knuckles having a pivotal relation to said frame, fender arms carried by and projecting forwardly from said knuckles, latches engaging said knuckles to hold the fender arms raised, means for tripping said latches to release the knuckles and permit the fender to drop to catching position, and fender raising and resetting means controlled by the driver in his seat.

In testimony whereof I affix my signature in presence of two witnesses.

LEWIS C. PRITCHARD.

Witnesses:
J. MENTOR CALDWELL,
W. M. MILLER.